Nov. 28, 1933.     A. DIETRICH     1,937,267
APPARATUS FOR VARYING THE LEVERAGE OF THE LINK
AND LEVER GEARING OF VEHICLE BRAKES
Filed April 4, 1932
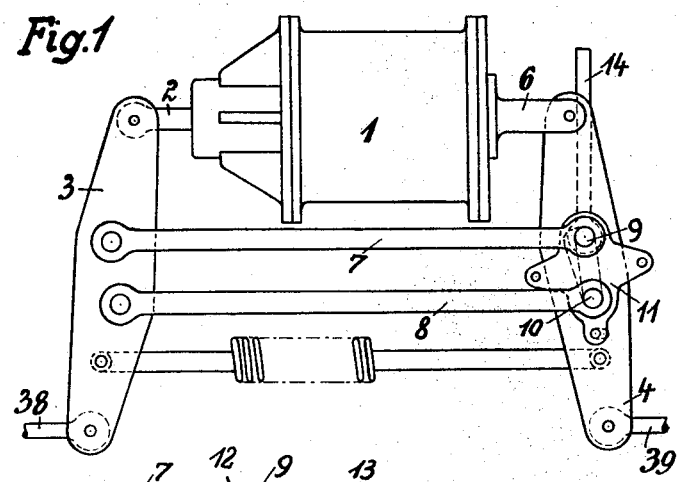
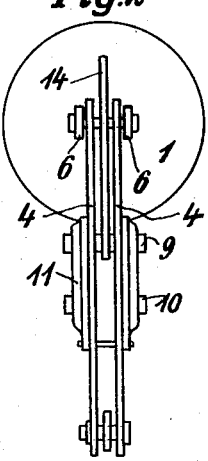
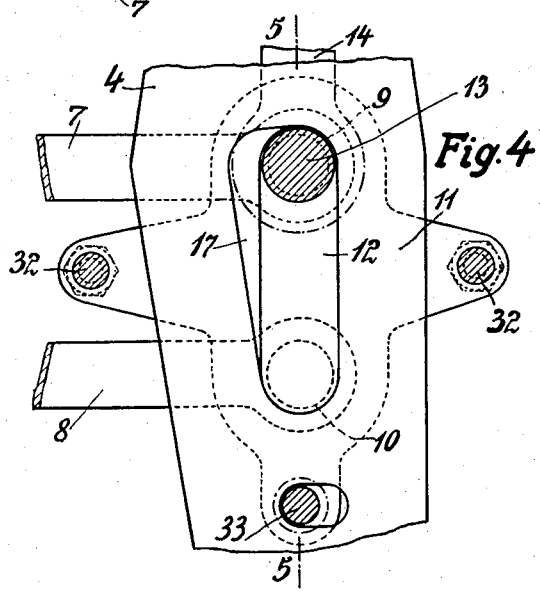
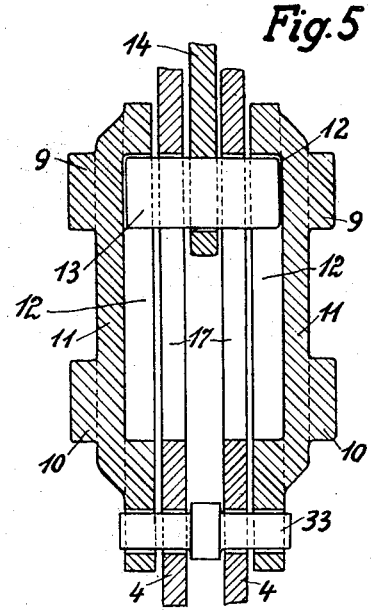
Inventor:
Anton Dietrich,
by E. F. Wendroth
Atty Patented Nov. 28, 1933

1,937,267

UNITED STATES PATENT OFFICE 1,937,267

APPARATUS FOR VARYING THE LEVERAGE OF THE LINK AND LEVER GEARING OF VEHICLE BRAKES

Anton Dietrich, Graz, Austria, assignor to firm Grazer Waggon- und Maschinen-Fabriks Actiengesellschaft vormals Joh. Weitzer, Graz, Styria, Austria, a company of Austria Application April 4, 1932, Serial No. 603,175, and in Austria June 26, 1931

2 Claims. (Cl. 188—195)

My invention relates to apparatus for varying the leverage of the link and lever gearing of vehicle brakes according to the load on the vehicle. My invention relates further to apparatus of that class disclosed in the U. S. patent application Ser. No. 518,572, which has become Patent No. 1,898,528 comprising a source of power including two parts movable relatively to each other substantially rectilinearly and two brake levers, one being pivotally connected at one end to one part of the said source of power and the other being pivotally connected at one end to the other part of the said source of power, while of the other end of the said brake levers each is pivotally connected to one half of a pair of brake actuating link and lever gearings and are adapted to move the said two halves simultaneously in opposite directions. In this class of apparatus the said two brake levers are connected at points between their ends by a link parallelogram, one side of which is formed by part of one of the said brake levers, while the opposite side of the said link parallelogram is connected to the other brake lever by a pivot pin adapted to be shifted relatively to the ends of the brake lever with which it is associated. In the apparatus disclosed in the said prior U. S. patent application Ser. No. 518,572 the two remaining sides of the link parallelogram are formed by two links pivoted on the one hand to one of the brake levers and on the other hand to the opposite side of the link parallelogram associated with the other brake lever. The pivot pin above referred to moves along slots in the other brake lever and in the side of the link parallelogram associated therewith. In the structure just described, the distance between the two links connecting the two brake levers must of necessity be greater than the length of the said slots and this results in certain difficulties of construction if the brake levers are comparatively short.

The object of the present invention is to improve the struction above described, whereby the geometrical axis or centre of the movable journal pin may be brought in either of its extreme positions into coincidence with the geometrical axis or centre of the corresponding journal pin connecting the side of the link parallelogram associated with the slotted brake lever.

The drawing illustrates an embodiment of the present invention. Fig. 1 is a diagrammatical side elevation of the apparatus and Fig. 2 is a front elevation of the same. Fig. 3 shows on a larger scale a plan view and Fig. 4 a section on the line 4, 4 Fig. 3 and Fig. 5 a section on the line 5, 5 Fig. 4.

In Figs. 1 and 2, 1 indicates the source of power actuating the brakes, say an air pressure cylinder and 3, 4 are the brake levers. The brake lever 3 is pivotally connected at one end to the piston rod 2 of the cylinder 1 and on the other hand to one half 38 of a pair of brake actuating link and lever gearings. The other brake lever 4 is pivotally connected on the one hand to a rod 6 secured to the cylinder 1 and on the other hand to the other half 39 of the pair of brake actuating link and lever gearings. One side of the link parallelogram connecting the two brake levers is formed by part of the brake lever 3, while two further sides of this link parallelogram are formed by links 7, 8 pivotally connected on the one hand to the brake lever 3 and on the other hand to the fourth side of the link parallelogram associated with the brake lever 4, consisting of two parallel plates suitably spaced apart. This fourth side of the link parallelogram comprises two parallel plates 11 rigidly held together by stay bolts 32 and arranged on the outer sides of the plates forming the brake lever 4. The inner sides of the plates 11 are provided with grooves 12 and the two plates constituting the lever 4 are provided with longitudinal parallel slots 17 located opposite each other. A bolt 33 passing through an elongated transverse slot in the brake lever 4 and through circular holes in the plates 11 and provided with a central shoulder between the plates forming the lever 4 holds the said lever 4 and the plates 11 in proper lateral spaced relation.

13 is the movable pivot pin passing through the slots 17 of the lever 4 with its ends engaging into the grooves 12 in the plates 11. 14 is a link engaging the pivot pin 13 and adapted to move this pivot pin along the slots 17 and the grooves 12. On the outer sides of the plates 11 are provided journal pins 9 and 10 which engage with the links 7 and 8 respectively. The operation of the above described apparatus is as follows:

The fulcrum of the brake lever 4 is formed by the pivot pin 13 movable by the link 14 along the slots 17 and the grooves 12. The force transmitted from the brake cylinder through the brake link and lever gearing to the brake shoes is varied as the force transmitted to the rod 7 or to the rod 8 predominates. The variations of the force transmitted is brought about by shifting the pivot pin 13. When the latter is in the position shown in Fig. 5, that is, when the pivot pin is coaxial with the journal pins 9, on which the rod 7 is journalled, the greater part of the force exerted by the brake cylinder is transmitted through the rod 7, while only a small part of the force is received by the rod 8, determined by the ratio of the lever arms. The further the pivot 13 is moved downwardly in the slots 17 and grooves 12, the greater is the portion of force received on the rod 8, and the pressure on the brake shoes varies in correspondence. When the pivot pin 13 reaches its lowermost position, in which it is coaxial with the journal pins 10, acted upon by the rod 8, almost the entire force exerted by the brake cylinder is transmitted through the rod 8, the pivot points of which now act as the pivot points for the brake lever. The part 11 constituting the fourth side of the link parallelogram is capable of rocking independently of the movement of the brake lever 4 since the bolt 33 is freely movable in the transverse elongated hole of the plates constituting the brake lever 4.

Since shifting the fulcrum of the brake lever 4 will quite likely cause a variation of the stroke of the piston of the brake system, and since, on the contrary, a uniform piston stroke is desirable, such uniform stroke is obtained by increasing the width of the slots 17 in the brake lever 4 towards the pivot pins 9, thus resulting in a greater play of the bolt 13 as it approaches the pivot pins 9. This increased play in turn results in an approximate uniformity of the piston stroke of the brake cylinder when the leverage of the link and lever gearing is varied.

As above stated the geometrical axis or center of the pivot pin 13 coincides in the extreme position of the pin with the geometrical axes or centers of the journal pins 9 or 10.

Owing to this arrangement the distance between the links 7 and 8 is exactly equal to the length of the slots 17 and grooves 12 and this permits of an exact adjustment of the leverage of the link and lever gearing of the brakes and moreover results in a strong compact construction of the entire apparatus.

What I claim is:

1. An apparatus for varying the leverage of the link and lever gearing of vehicle brakes, comprising two brake levers, a source of force adapted to turn one of the said brake levers relatively to the others, a link parallelogram composed of part of one of the said brake levers, two links pivoted to the last named brake levers and a fourth side pivoted to the other brake lever, journal pins on the said fourth side engaging the said links, guides extending along the said fourth side of the link parallelogram and the brake lever to which the said fourth side is pivoted, a pivot pin engaging the said guides, means comprising a link for moving the said pivot pin along the said guides, the ends of the said guides being opposite the said journal pins, whereby the geometrical axis of the said pivot pin coincides in its extreme positions with the geometrical axes of the said journal pins.

2. An apparatus for varying the leverage of the link and lever gearing of vehicle brakes comprising two brake levers, a source of force adapted to turn one of the said brake levers relatively to the others, a link parallelogram composed of part of one of the said brake levers, two links pivoted to the last named brake levers, and a fourth side pivoted to the other brake lever, the said fourth side of the link parallelogram comprising two parallel plates, parallel grooves on the inside of the said plates and journal pins on the outer sides of the said plates engaging the said links, slots extending along the brake lever to which the said fourth side of the link parallelogram is pivoted, a pivot pin engaging the said grooves and slots, means comprising a link for moving the said pivot pin along the said grooves and slots, the ends of the said grooves and slots, being opposite the said journal pins, whereby the geometrical axis of the said pivot pin coincides in its extreme positions with the geometrical axes of the said journal pins.

ANTON DIETRICH.